(12) United States Patent  
Demangone (10) Patent No.: US 6,474,878 B1
(45) Date of Patent: Nov. 5, 2002

(54) OPTICAL CONNECTOR (75) Inventor: Drew A. Demangone, Latrobe, PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/536,522

(22) Filed: Mar. 28, 2000

(51) Int. Cl.$^7$ ................................................ G02B 6/36
(52) U.S. Cl. ........................................ 385/78; 385/147
(58) Field of Search .............................. 385/78–80, 147

(56) References Cited

U.S. PATENT DOCUMENTS

| | | | |
|---|---|---|---|
| 4,046,454 A | 9/1977 | Pugh, III | 350/96 |
| 4,385,801 A | 5/1983 | Bubanko | 350/96 |
| 4,657,341 A | 4/1987 | Sammueller | 350/96.22 |
| 4,801,191 A | 1/1989 | Nakai et al. | 350/96.2 |
| 4,818,058 A | 4/1989 | Bonanni | 350/96.2 |
| 5,257,334 A | 10/1993 | Takkahashi | 385/65 |
| 5,315,678 A | 5/1994 | Maekawa et al. | 385/59 |
| 5,416,868 A | 5/1995 | Kakii et al. | 385/80 |
| 5,519,798 A | 5/1996 | Shahid et al. | 385/65 |
| 5,619,610 A * | 4/1997 | King et al. | 385/139 |
| 5,737,463 A | 4/1998 | Weiss et al. | 385/59 |
| 5,809,191 A * | 9/1998 | Stevens et al. | 385/59 |
| 6,282,352 B1 * | 8/2001 | Kato et al. | 385/92 |

FOREIGN PATENT DOCUMENTS

| | | | |
|---|---|---|---|
| JP | 55-45051 | 3/1980 | |
| JP | 57-58112 | 4/1982 | |
| JP | 11-295562 | * 10/1999 | 385/139 |

OTHER PUBLICATIONS

English language abstract for JP 61–61111 published Mar. 28, 1986 and drawings, 1 page, "Optical Connector Of multi–Core" by Koichiro et al.

English language abstract for JP55–45051 published Mar. 29, 1980, 1 page, "Mulicore Connector of Optical Fiber".

English language abstract for JP57–58112 published Apr. 7, 1982, 1 page "Positioning Structure Of Optical Connector".

* cited by examiner

Primary Examiner—Akm E. Ullah
(74) Attorney, Agent, or Firm—Harrington & Smith, LLP (57) ABSTRACT An optical fiber connector subassembly comprising a first housing member and a first optical fiber locator. The first optical fiber locator is connected to the housing member. The locator is comprised of silicon and has channels for positioning optical fibers therein. The housing member comprises a recess. At least a portion of the locator is located in the recess to interlock the locator with the housing member.

13 Claims, 11 Drawing Sheets

OPTICAL CONNECTOR

BACKGROUND OF THE INVENTION

1. Field of the Invention

The present invention relates to optical connectors and, more particularly, to fiber array connectors.

2. Brief Description of Earlier Developments

U.S. Pat. No. 5,828,805 discloses a multifibre connector plug having a ferrule or connector plug part on optical fibres. The connector plug part has two guide pins extending from a front face. The guide pins are received in holes of a mating connector to align the optical fibres with optical fibres in the mating connector. Housing components of conventional ferrules are manufactured with polymer material one at a time. One such conventional ferrule is sold by Nippon Telephone & Telegraph with insertion loss specifications listed as 0.4 dB typical and 0.7 dB maximum loss per channel. Such ferrules are sold under the tradenames MPO, MP, MT and MT-RJ.

A problem with conventional fiber optic connectors is that their ferrule housing components are manufactured one at a time with very high or exact tolerances. It is desired to manufacture fiber optical connectors with the same or higher tolerances as conventional connectors, but manufacture optical fiber positioning members in batches for faster and less expensive manufacturing. A further problem with conventional fiber optic connectors is that they use high tolerance guide pins, such as ±1 micron. Such high tolerance pins are expensive. It is desired to manufacture a fiber optic connector which has the same or less insertion losses as in conventional connectors, but which uses lower tolerance, less expensive guide pins, such as having a tolerance of ±5 microns. A further problem with conventional connectors is the use of an extra component; namely, a spring to bias the guide pins against optical fiber support members or blocks. The extra spring component adds to the cost of manufacturing the connector. It is desired to eliminate the spring from the optical fiber connector to reduce the cost of the connector.

A potential problem which could develop if a silicon ferrule were to be used is that an exposed or unprotected portion of a silicon ferrule would tend to chip due to its nature. Although a silicon ferrule which chips would not ordinarily affect signal transmission, the chipping of a silicon ferrule could be construed as being unsightly and could be mistakenly construed as affecting quality of the connector. It is a desire to allow use of a silicon ferrule with a reduced risk that the ferrule will become chipped.

SUMMARY OF THE INVENTION

In accordance with one embodiment of the present invention, an optical fiber connector subassembly is provided comprising a first housing member and a first optical fiber locator. The first optical fiber locator is connected to the housing member. The locator is comprised of silicon and has channels for positioning optical fibers therein. The housing member comprises a recess. A portion of the locator is located in the recess to interlock the locator with the housing member.

In accordance with another embodiment of the present invention, an optical fiber connector is provided comprising a housing and a locator. The locator is connected to the housing. The locator is comprised of silicon. At least one pin receiving area is located between the locator and a portion of the housing.

In accordance with one method of the present invention, a method of manufacturing an optical fiber connector is provided comprising steps of forming an optical fiber locator comprising silicon; connecting the locator to a housing member; and locating optical fibers against the locator.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Although the present invention will be described with reference to the embodiments shown in the drawings, it should be understood that the present invention can be embodied in many alternate forms of embodiments. In addition, any suitable size, shape or type of elements or materials could be used.

Figure 1:
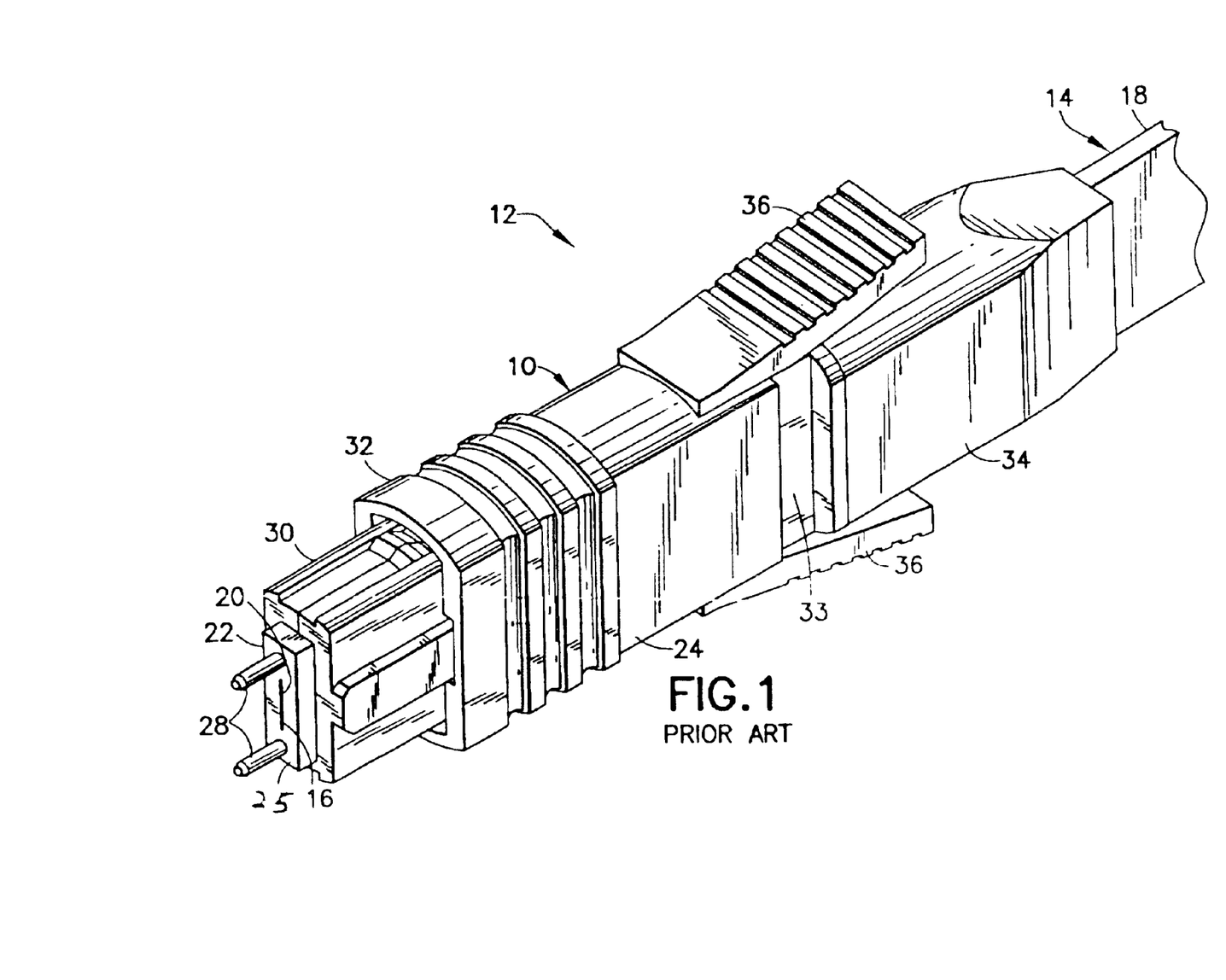
FIG. 1 is a perspective view of a portion of a conventional optical cable assembly.

Referring to FIG. 1, there is shown a perspective view of a conventional optical fiber connector 10. The connector 10 can be part of a cable assembly 12 further comprising an optical fiber ribbon cable 14. The cable assembly 12 could include additional components. The cable 14 generally comprises optical fibers 16 (typically having core and cladding material), a buffer material (not shown), strengthening material (not shown), and a jacket or cover 18. The cover 18 is removed at the end 20 of the fibers 16 passing through the ferrule 26. Any suitable optical fiber cable could be provided. In this embodiment the end 20 of the fibers 16 are aligned in a row for engaging a mating optical connector.

The connector 10 generally comprises a subassembly 22 and a connector housing 24. The subassembly 22 generally comprises the end 20 of the fibers 16, a ferrule housing 25, a locator 27 (see FIG. 2), and guide pins 28. The connector housing 24 generally comprises a coupling body 30, a coupling sleeve 32, a carrier sleeve 33, and an end sleeve 34.

A similar connector housing is described in U.S. Pat. No. 5,828,805 which is hereby incorporated by reference in its entirety. However, in alternate embodiments any suitable type of connector housing could be provided. The subassembly 22 is fixedly connected to the coupling body 30. The coupling body 30 is fixedly connected to the coupling sleeve 32. The coupling sleeve 32 is movably mounted on the carrier sleeve 33 and biased by a spring (not shown) in a forward direction. The coupling sleeve 32 includes lips 36. The end sleeve 34 is connected to the carrier sleeve 33 and surrounds a portion of the cable 14.

Figure 2:
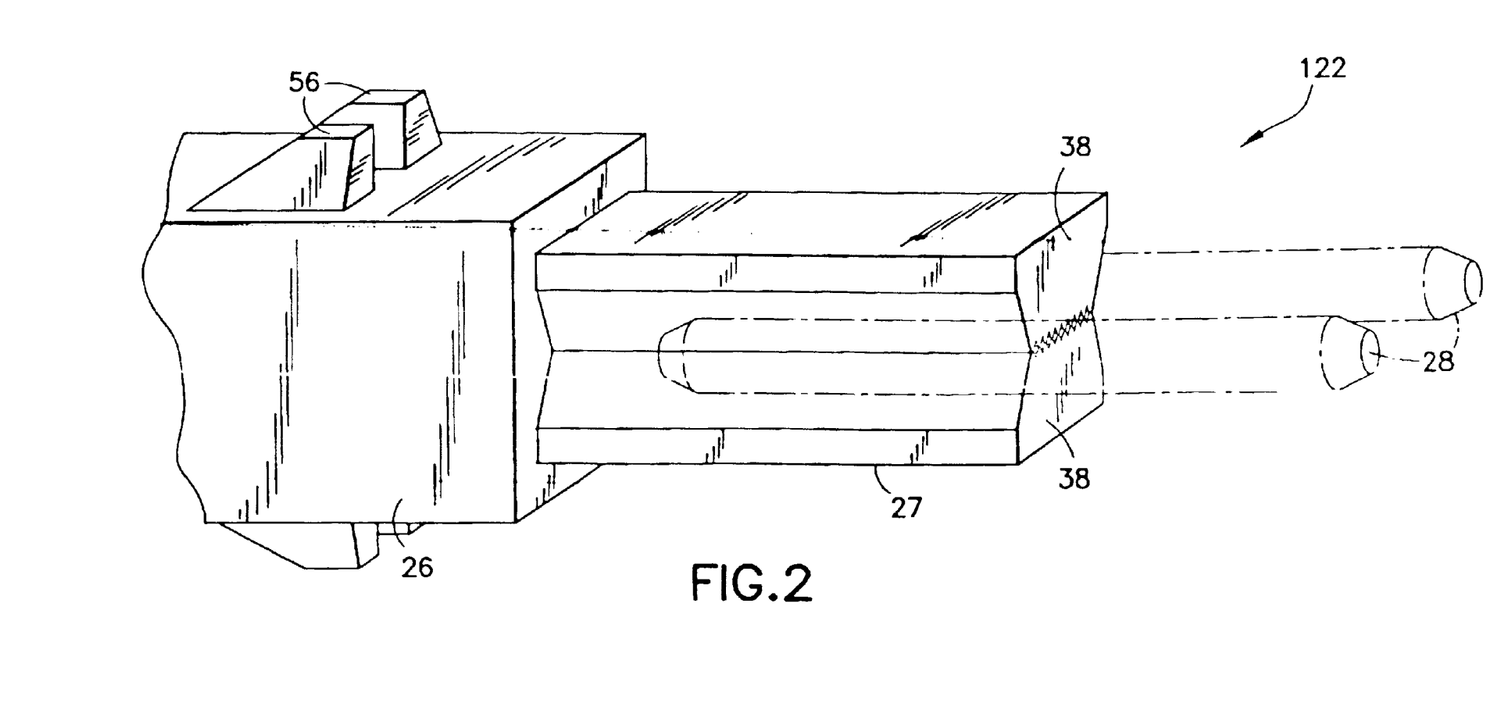
FIG. 2 is a partial perspective view of a first embodiment of a subassembly used to make an optical connector incorporating features of the present invention.
Figure 3:
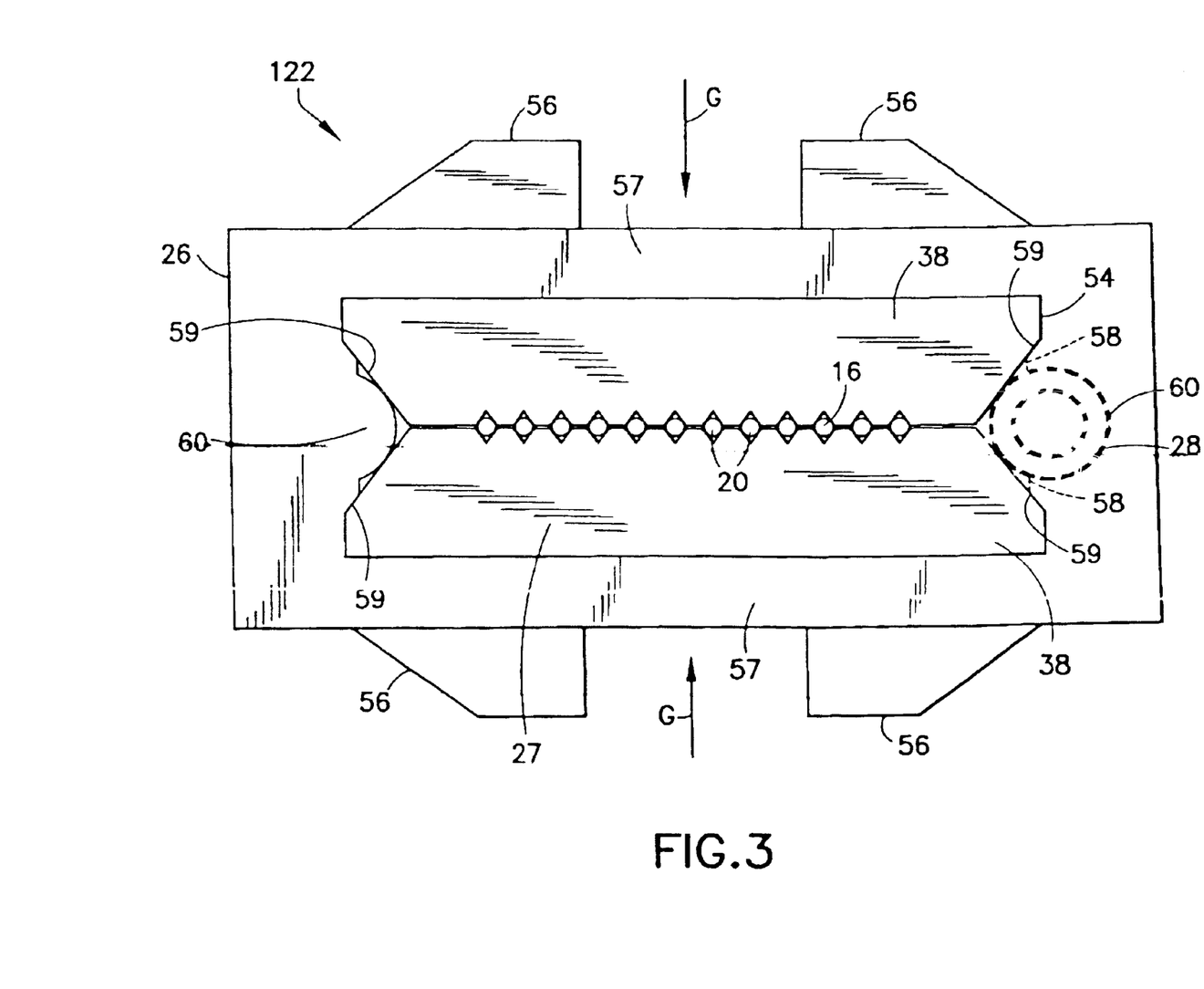
FIG. 3 is a front elevational view of the subassembly shown in FIG. 2.
Figure 4:
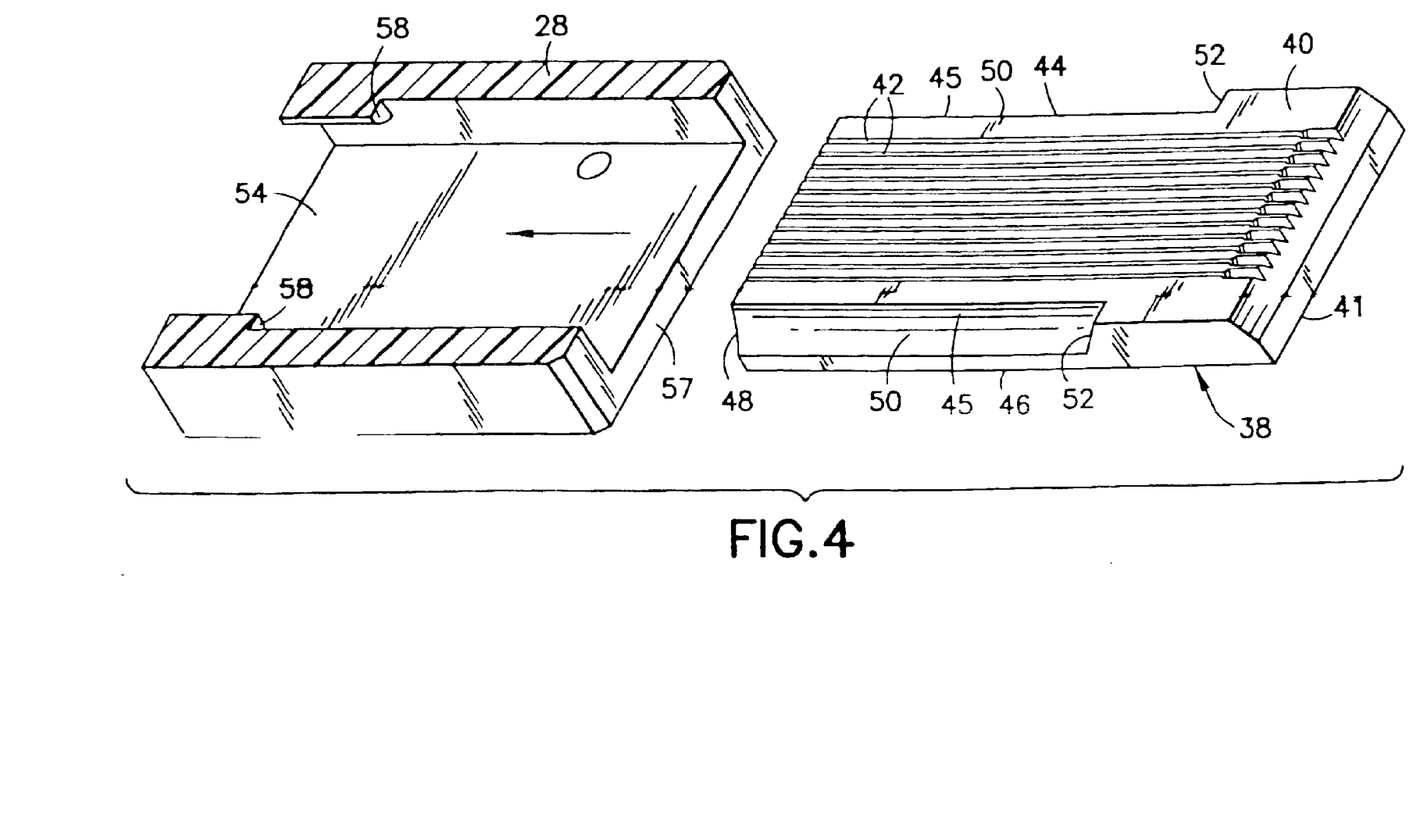
FIG. 4 is an exploded, partial cross-sectional, perspective view of the subassembly shown in FIG. 2.

Referring now to FIGS. 2 and 3 a first embodiment of a subassembly 122 incorporating features of the present invention is shown. The ferrule 27 generally comprises two silicon members or locator members 38. In this embodiment the silicon members 38 are substantially identical to each other, but orientated in reverse mirror positions relative to each other. In alternate embodiments more or less than two silicon members could be provided, and they could have different shapes from each other. Referring also to FIG. 4 one of the silicon members 38 is shown. In an alternate embodiment the silicon member 38 could be comprised of additional or alternative materials, such as plastic, crystal, glass, ceramic or silica. The locator member 38 generally comprises a first side 40 having grooves or channels 42 therealong, an opposite second side 41, two lateral sides 44, 46, and a front side 48. The channels 42 have a general "V" shape for receiving and locating the fibers 16 therein. However, the channels 42 could have any suitable shape. The lateral sides 44, 46 include a sloped surface 50 extending from the front side 48 and a stop 52 at a rear end of the sloped surface 50 to engage, for example, stainless steel pins 28. However, in an alternate embodiment the sloped surfaces 50 and/or the stop 52 need not be provided.

In a preferred method of manufacturing the locator members 38 a batch or plurality of the locator members are manufactured at the same time by use of known lithography techniques. In particular, a single substrate or wafer of Silicon is used to make a plurality of the locator members, such as fifty from a four inch wafer. Any suitable type of forming processing could be used to form the locator members out of a suitable substrate such as vapor disposition etching, plasma etching, or photo etching. In addition to the ability to form a batch of the locator members at a same time from a single substrate, the forming process can also make the dimensions and shape of the locator members with very precise and small tolerances, such as ±1 micron or less.

In forming the subassembly 122 a portion of the material surrounding fibers 16 is removed from the ends 20. The exposed fibers are sandwiched between two of the locator members 38. More particularly, the ends 20 are located in opposing "V" shaped slots 42. In the embodiment shown in FIGS. 2 and 3 the locator members 38 are paired, then inserted into the receiving area 54. The ferrule housing 26 wedges the locator members 38 towards each other to hold the subassembly together. Preferably, once chips 38 are placed in housing 26, fibers 16 are inserted into openings formed by V-grooves 42. Fibers 16, ferrule 27 and the housing 26 are then bonded together, for example, by use of epoxy. However, any suitable means could be used to attach the various components together.

In this embodiment the ferrule housing 26 is a one-piece member preferably comprised of molded polymer material. Preferably the polymer material is resiliently deflectable. However, in alternate embodiments the ferrule housing could be comprised of multiple members and/or any suitable material or forming process could be used. The ferrule housing 26 includes a receiving area 54 and mounting projections 56. The two locator members 38 are located in the receiving area 54. The ferrule housing 26 helps retain the two locator members 38 until a more permanent retention step is used (such as the bonding described above). The ferrule housing 26 also includes stops 58 in the receiving area 54 that interact with the stops 52 to locate the locator members 38 at a predetermined position relative to the ferrule housing 26. In particular, the stops 58 are part of a projection extending receiving area 54 and interact with the stops 52 to locate the front side 48 of the locator members 38 relative to the front end of the ferrule housing 26. Any suitable means could be used to locate the locator members at predetermined positions relative to the ferrule housing. In this embodiment, the locator 27 and ends 20 extend outward past the front of the housing 26. As seen in FIG. 4, the locator members 38 are preferably slid into the receiving area 54 through the rear end of the ferrule housing 26. Surfaces 50 and 52 can locate the locator members 38 at a suitable location in the receiving area 54. The walls 57 can bias the locator members 38 towards each other as indicated by arrows G (FIG. 3). Any suitable types of shapes of housing 26 could be provided. The front face of housing 26 includes areas 60 which may receive pins 28 (typically on another component of the optical system). In a preferred embodiment the pins 28 contact the sloped surfaces 50 of the locator members 38. The sloped surfaces 50 form concave shapes on lateral sides of the locator 27. The pins 28 extend into the concave shapes and directly contact the sloped surfaces 50. Because the locator members 38 can be formed with very great precision, this allows the pins 28 to be positioned relative to each other and relative to the ends 20 of the fiber 16 with great precision. Therefore, the pins 28 do not need to be expensive high tolerance (±1 microns) guide pins as in conventional connectors, but instead can be less expensive guide pins, such as having a tolerance of ±5 microns. The subassembly 122 may also be biased by a spring as is known.

Figure 5:
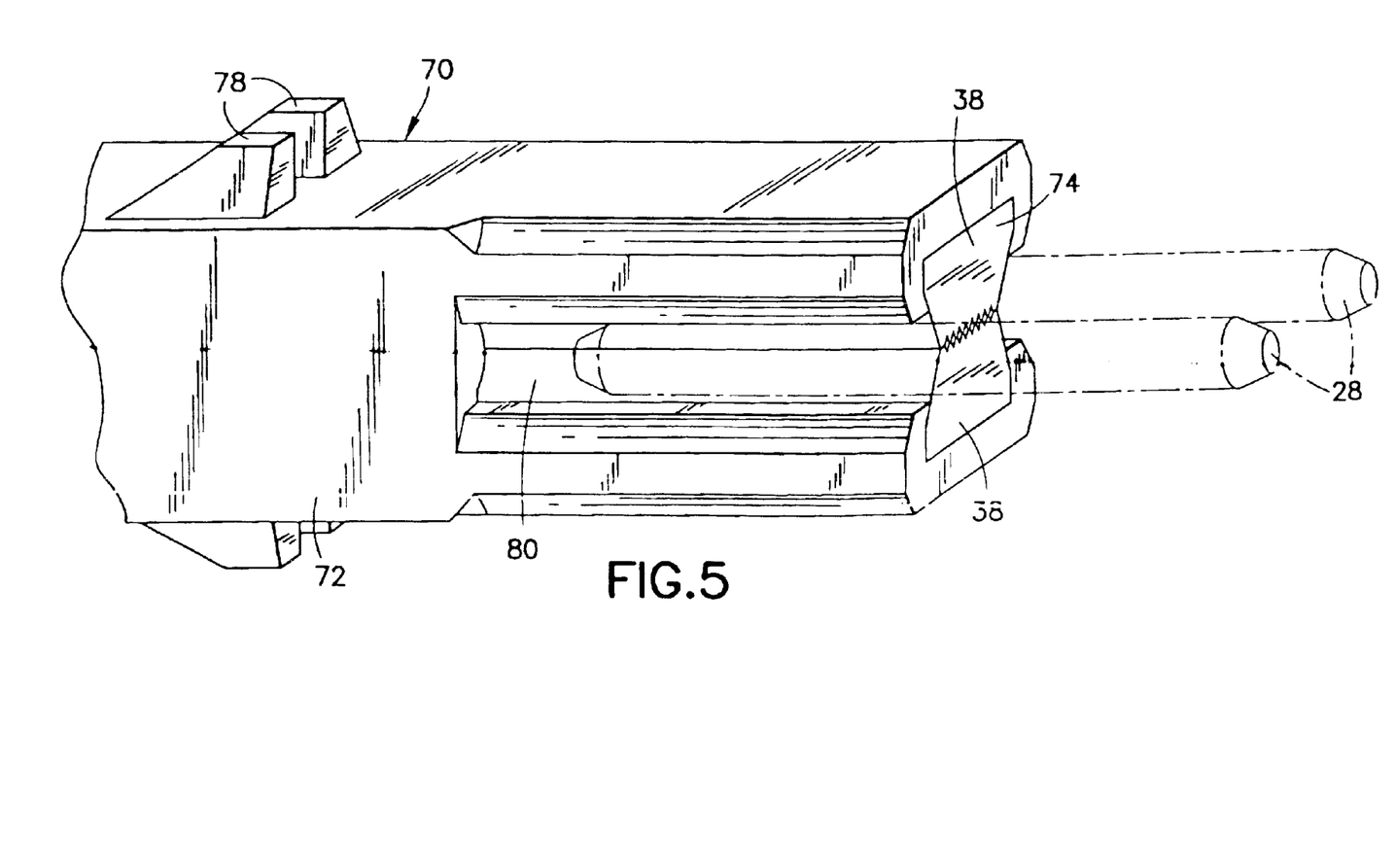
FIG. 5 is a partial perspective view of a second embodiment of a subassembly used to make an optical connector incorporating features of the present invention.
Figure 6:
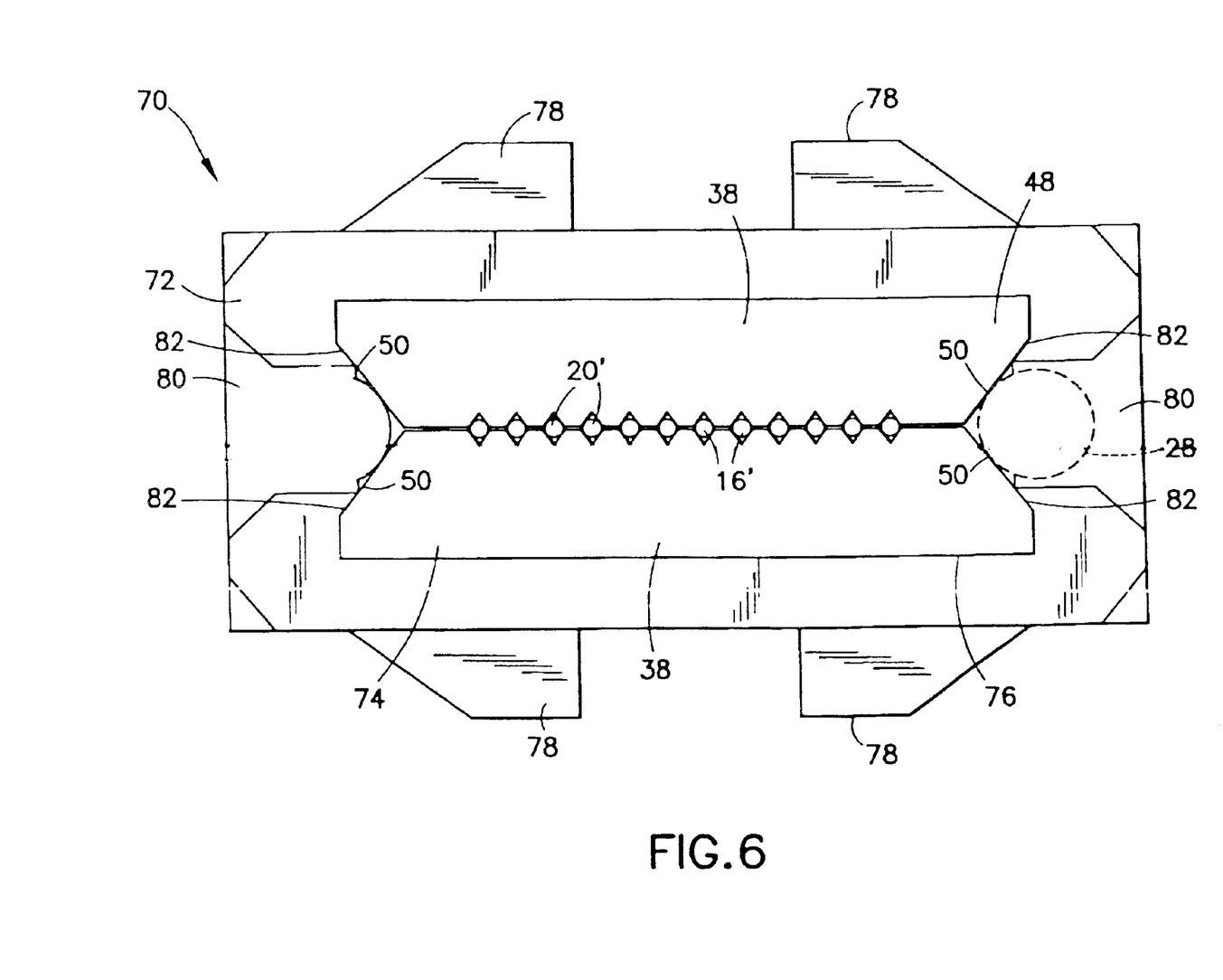
FIG. 6 is a front elevational view of the subassembly shown in FIG. 5.

Referring to FIGS. 5 and 6 a second alternative embodiment of a subassembly 70 for a mating optical connector is shown. The subassembly 70 generally comprises a ferrule housing 72, a ferrule 74, and optical fibers 16'. In this embodiment the ferrule housing 72 is a one-piece member preferably comprised of molded polymer material. However, in alternate embodiments the ferrule housing could be comprised of multiple members and/or any suitable material or forming process could be used. The ferrule housing 72 includes a receiving area 76 and mounting sections 78. The ferrule housing 72 includes apertures or slots 80 through the lateral sides into the receiver area 76 which receive pins 28 (typically located on another component of the optical connector system). The receiving area 76 also includes sloped or angled surfaces 82. Differently than the first sub-assembly, the second sub-assembly surrounds the entire length of silicon ferrule 74 for protection.

The locator 74 generally comprises two of the locator members 38. However, different locator members could be used. The ends 20' of the fibers 16' are located between the locator members 38 and preferably flush with front end 48. The locator 74 is located in the receiving area 76 of the ferrule housing 72. The angled surfaces 82, by contact with the angled surfaces 50 of the locator members 38, and the projection (which includes stop surface 102), by contact with surface 52, help to position the locator 74 at a predetermined position in the receiving area 76. The slots 80 and concave areas formed by the angled surfaces 50 form areas for receiving the pins 28 of the connector 10 when the connector 10 is connected to the mating connector. The pins 28 can directly contact the locator members 38 along the angled surfaces 50. Because the locator members 38 can be formed with very great precision, this allows the pins 28 to be positioned relative to the locator 74 and relative to the ends 20' of the fiber 16' with great precision. Therefore, the pins 28 do not need to be expensive high tolerance (±1 micron) guide pins as in conventional connectors, but instead can be less expensive guide pins, such as having a tolerance of ±5 microns. Because of the high tolerance or great precision of the dimensions of the locator members 38, and because of the registration being provided by the pins 28 directly bearing against the locators 27, 74, the two locators 27, 74 can be precisely located relative to each other when the two connectors are connected to each other such that the ends 20,20' of the optical fibers 16,16' are aligned with each other with small insertion losses such as about 0.4 dB typical loss per channel or less and about 0.7 dB maximum loss per channel or less.

Figure 6A:
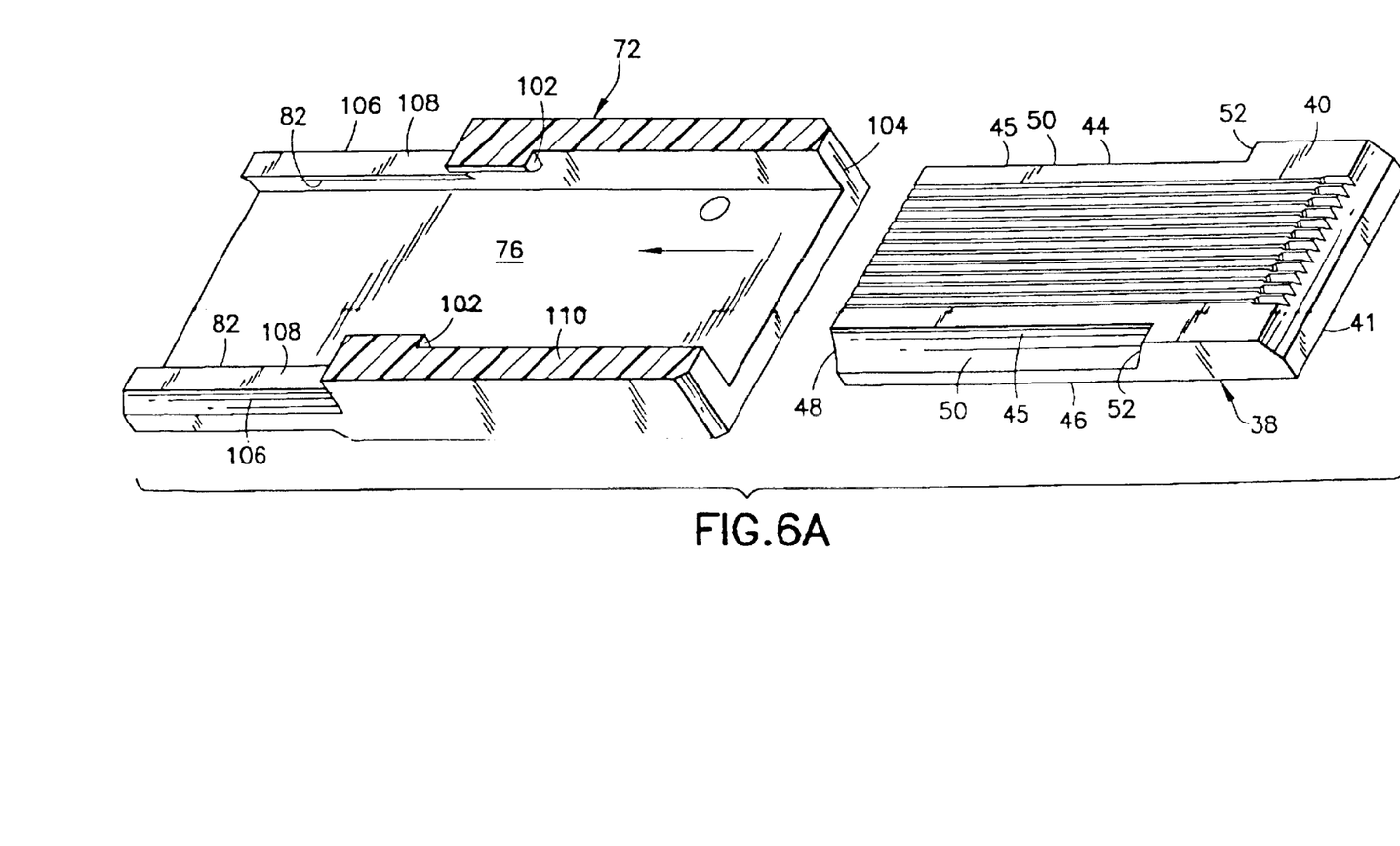
FIG. 6A is an exploded, partial cross-sectional, perspective view of the subassembly shown in FIG. 6.

Referring now to FIG. 6A, an exploded perspective view, in partial cross-section, of the subassembly in FIGS. 5 and 6 is shown. The housing member 72 has positioning surfaces 82 and stop surfaces 102. The locator member 38 can be slid into the receiving area 76 through the rear end 104 of the first housing member 72. The positioning surfaces 82 contact the angled surfaces 50 and the stop surfaces 102 contact the stops 52 to locate the locator member 38 in a predetermined position in the receiving area 98. At this point, the fibers are preferably inserted into ferrule 74. Then the fibers 16, ferrule 74 and housing 72 are, preferably, bonded together with epoxy. In this embodiment the entire length of the locator member 38 is protected by housing 72. The sections 106 of the side walls 96, while protecting ferrule 74, expose part of the sides 44, 46 of the locator member 38. This open area along sides 44, 46 receives the pins 28 from a mating component.

Figure 7:
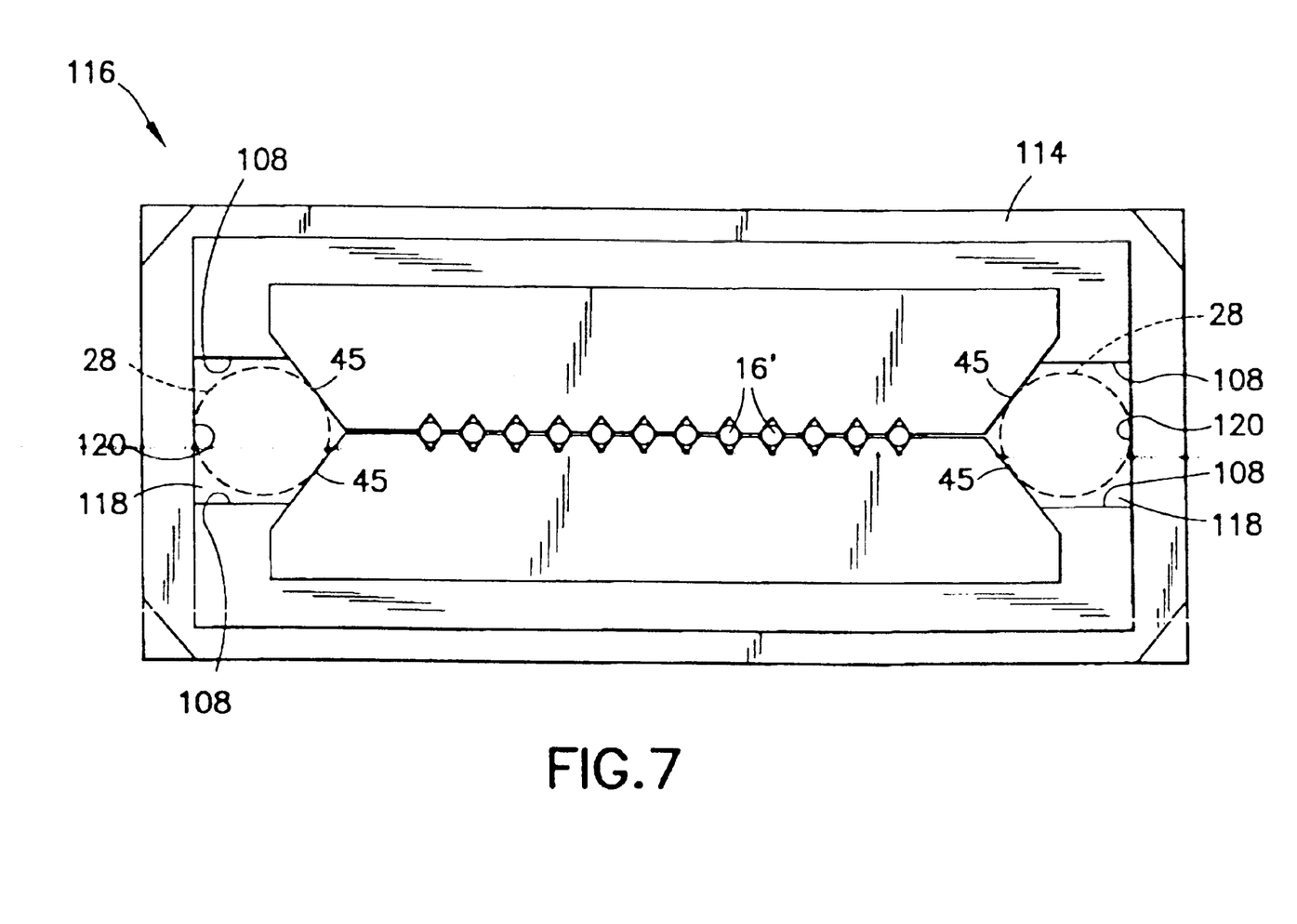
FIG. 7 is a front elevational view of the subassembly shown in FIG. 6 connected to an outer housing member.

Referring to FIG. 7, the housing 72 can be connected to an outer housing member 114 to form a connector 116. The outer housing member 114, ferrule 74 and housing 72 define an enclosure 118 so that pins 28 can be received. The areas 118 are formed between surfaces 108, surface 45 and surfaces 120 of the outer housing member 114. Thus, the pins can be sandwiched directly against the surfaces 45 by the housing member 114. Preferably, the connector is female and can receive pins 28 on the mating component (such as a male connector or another housing).

Figure 8:
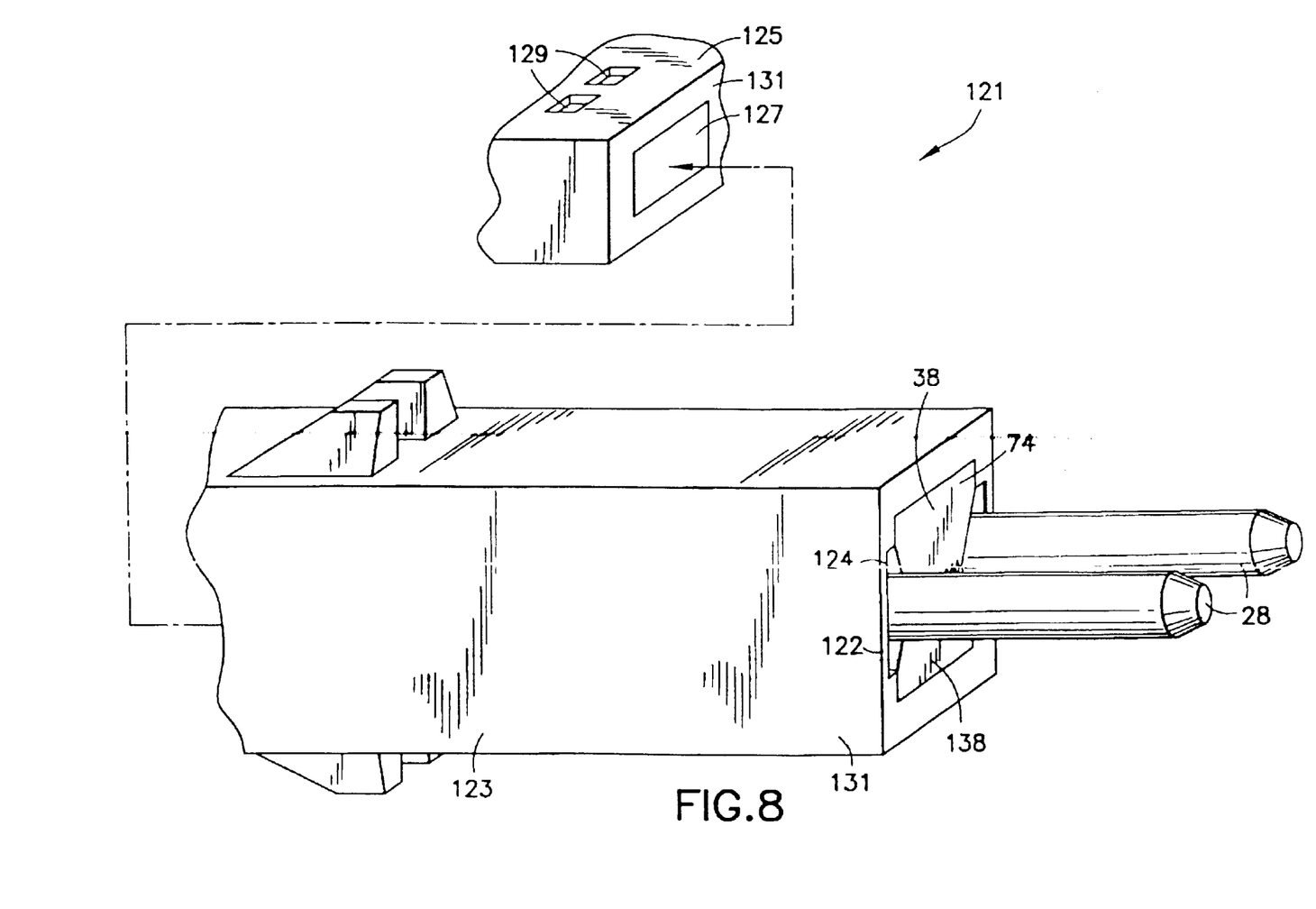
FIG. 8 is an exploded, partial perspective view of an optical connector having a third embodiment of a subassembly incorporating features of the present invention.
Figure 8A:
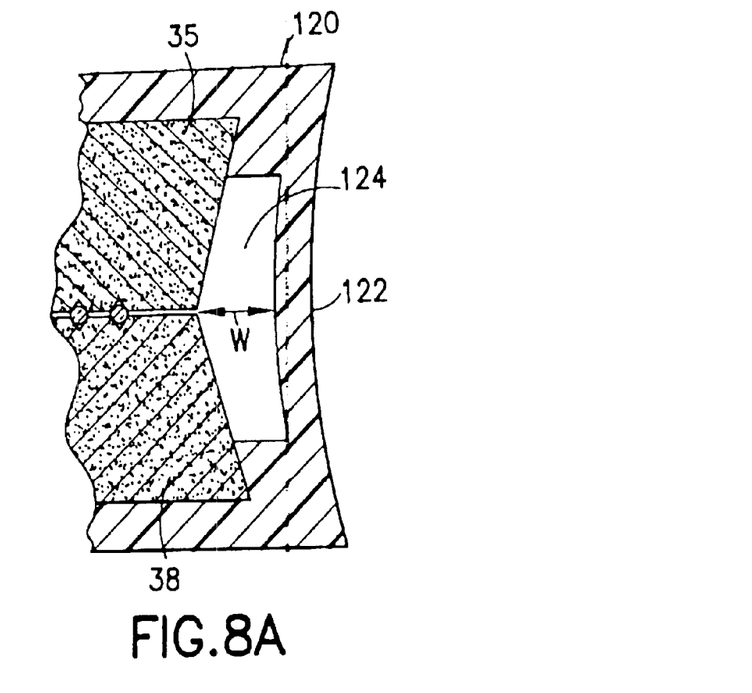
FIG. 8A is a partial cross-sectional view of the subassembly shown in FIG. 8 before insertion of the guide pins.
Figure 8B:
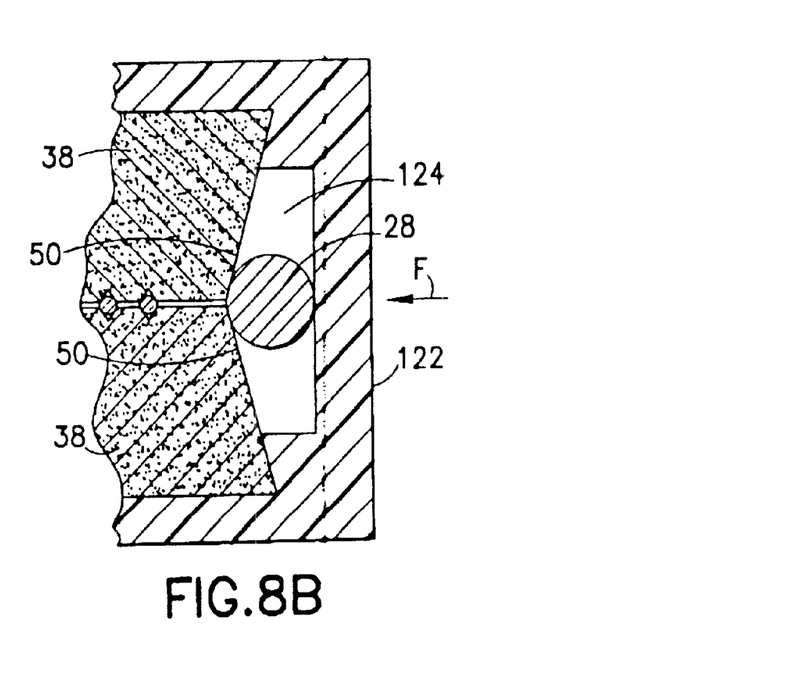
FIG. 8B is a partial cross-sectional view as in FIG. 8A after insertion of the guide pins.
Figure 9:
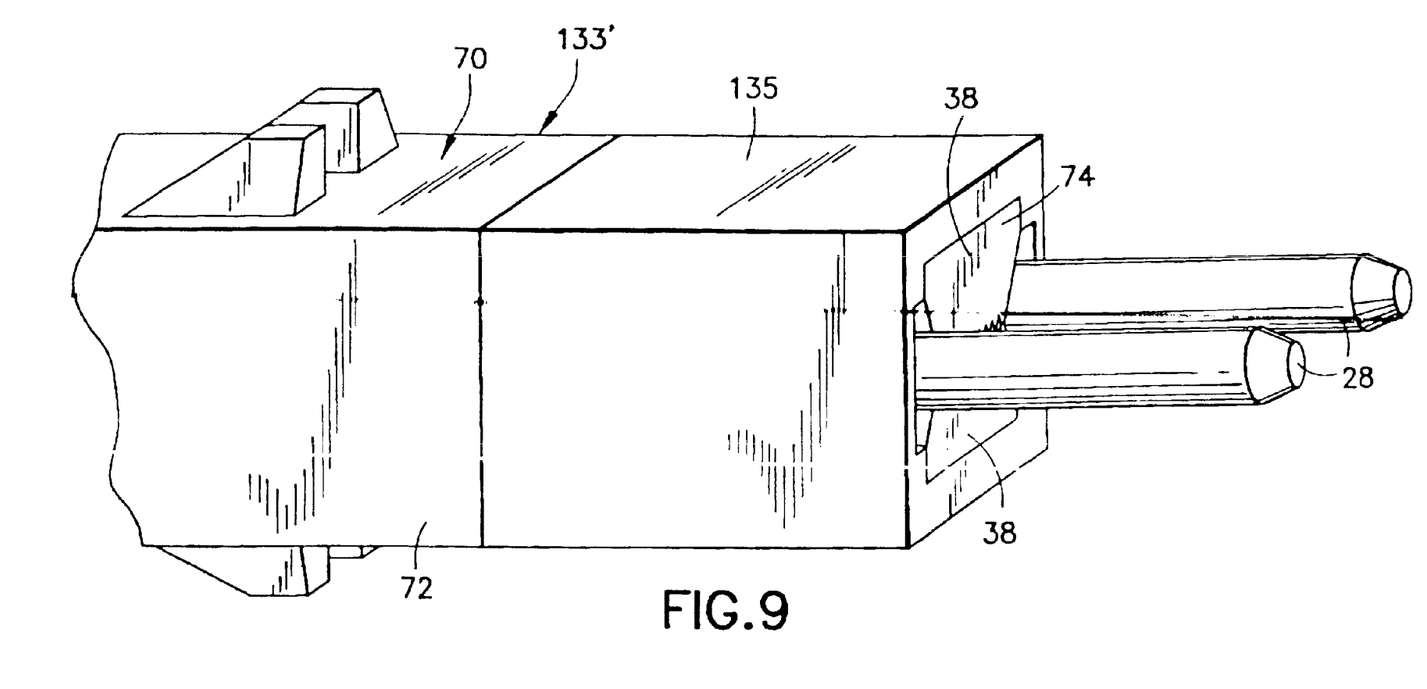
FIG. 9 is a partial perspective view of an alternate embodiment of the subassembly shown in FIG. 8.

Referring now to FIGS. 8, 8A and 8B a third alternate embodiment is shown. In this embodiment an optical connector 121 is provided comprising a subassembly 123 and an outer housing 125. The subassembly 123 is adapted to be inserted into a receiving area 127 of the outer housing 125, make a snap-lock engagement with the latch holes 129, and extend outward past the front face 131 of the outer housing 125. The subassembly 123 generally comprises the ferrule 74 having the silicon locator chips 38, the ends 20 of the fibers 16, and the housing 133. The housing piece 133 has a wall 122 that defines a pin receiving area 124. The wall 122 is bent or inwardly bowed in its natural or home position as shown in FIG. 8A when the pin 28 is not in the receiving area 124. This forms a width W of the receiving area 124 which is smaller than a width of the pin 28. When the pin 28 is inserted into the receiving area 124, the wall 122 is wedged or deflected outward. The wall 122 exerts a force F on the pin 28 to bias the pin 28 against the surfaces 50 of the locator members 38. Thus, separate spring clips for the pins 28 are not needed. If a male connector is desired, pins 28 could be inserted in area 124. Subsequently, the pins 28, ferrule 74 and housing 133 could be secured together, for example using epoxy. If a female connector is desired, ferrule 74 and housing 133 could be secured together, for example using epoxy. As seen in FIG. 9 a subassembly 123' could be provided comprising the subassembly 70 and a housing 133' could include a sleeve 135 which abuts the front end of the housing 72. In either arrangement inner housing 133 or 133' could be inserted into a larger housing such as outer housing 125 shown in FIG. 8, which, for example, may hold more than one inner housing 133, 133' and/or 72.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical fiber connector subassembly comprising:

a housing member having a front, a rear, recess and at least one housing stop; and a silicon ferrule, said silicon ferrule having channels for positioning optical fibers therein, said silicon ferrule further having two lateral sides, a front end, and a rear end, and at least one of said lateral sides has a sloped surface portion therein spanning from said front end towards said rear end and terminating at ferrule stop;

wherein said silicon ferrule is positioned in said, recess of said housing member such that said housing stop interacts with said ferrule stop to properly position said ferrule within said housing; and further comprising a pin positioned in each sloped surface portion, said pin position limited by being in contact with said ferrule stop; and whereby said housing, said ferrule, and said pin are kept in accurate positioning by said housing, said ferrule and said pin being in contact with each other at said housing and said ferrule stops.

2. A subassembly as in claim 1 wherein the silicon ferrule is finished to a fine tolerance whereby said pins may have a tolerance of ±5μ.

3. A subassembly as in claim 2 wherein the ferrule is finished to a fine tolerance of ±1μ.

4. A subassembly as in claim 1 wherein said sloped surface portion extends only part way and said ferrule stop is positioned between said front and said rear ends of said silicon ferrule.

5. A subassembly as in claim 1 wherein said ferrule comprises two substantially identical locator members, said optical fibers being locatable between said first and second locator members and wherein each locator member has adjacently positioned and interacting ferrule stops and sloped surface portions.

6. A subassembly as in claim 5 wherein said housing member comprises a first housing member and said subassembly further comprising a second housing member connected to the first housing member, wherein the pins are further positioned between the second housing member and said lateral sides of the ferrules.

7. A subassembly as in claim 6 wherein said second housing has a continuous perimeter and portions of the second housing are deflectable when pins are inserted therein, wherein the second housing member biases the pins against said lateral sides of the ferrules.

8. An optical fiber connector subassembly comprising:

a one piece housing member having a receiving area, the receiving area including at least one positioning surface along a portion of a side wall of the receiving area and one stop surface located at least one of the side walls of the receiving area between a front end and a rear end of the housing member;

a silicon ferrule adapted to be inserted into the receiving area, the silicon ferrule having channels of positioning optical fibers therein, the silicon ferrule including an angled surface, one at least one side of the ferrule, the angled surface adapted to make contact with a corresponding positioning surface of the housing member;

the silicon ferrule including a stop surface on at least one of the sides of the ferrule, the stop surface of the ferrule adapted to make contact with a complimentary stop surface of the housing member to locate the ferrule in a predetermined position in the receiving area; and wherein the housing member includes an aperture on at least one lateral side of the housing member into the receiving area, the aperture adapted to receive a guide pin.

9. The connector subassembly as in claim 8 wherein the angled surface and slot form a concave area for receiving the guide pin.

10. The subassembly of claim 8 wherein the ferrule is a two piece ferrule comprises a first locator member and a second locator member, a surface of the first locator and the second locator each having a series of grooves formed therein, wherein when the first locator member and the second locator member are oriented in a reverse mirror position relative to each other, channels are formed when the first and second locator are mated.

11. The subassembly as in claim 8 wherein the grooves are "V" shaped for receiving and locating the fibers.

12. A method of forming a optical fiber subassembly comprising the steps of:

forming a single piece housing member having a front, a rear, a recess and at least one housing stop;

forming an optical fiber ferrule, the ferrule having channels for positioning optical fibers therein, the ferrule further having two lateral sides, a front end, and a rear end, and at least one of the lateral, sides has a sloped surface portion therein spanning from the front end towards the rear end and terminating at a ferrule stop;

positioning the silicon ferrule in the recess of the housing member, wherein the housing stop interacts with the ferrule stop to position the ferrule in the housing at a predetermined position;

positioning a pin against each sloped surface portion of the ferrule, a position of the pin being limited by contact with the ferrule stop.

13. The method of claim 12 wherein the step of forming the ferrule further comprises the steps mating a pair of locator members together, each locator member having grooves formed on a side the grooves forming channels for positioning the optical fiber when the members are mated.

\* \* \* \* \*